T. ELKINTON.
Making Chemicals.

No. 39,135. Patented July 7, 1863.

Witnesses:

Inventor:

UNITED STATES PATENT OFFICE.

THOMAS ELKINTON, OF PHILADELPHIA, PENNSYLVANIA.

IMPROVEMENT IN THE MANUFACTURE OF ALKALINE SILICATES.

Specification forming part of Letters Patent No. 39,135, dated July 7, 1863.

*To all whom it may concern:*

Be it known that I, THOMAS ELKINTON, of Philadelphia, Pennsylvania, have invented a new and Improved Mode of Manucturing Silicate of Soda; and I do hereby declare the following to be a full, clear, and exact description of the same, reference being had to the accompanying drawings, and to the letters of reference marked thereon.

My invention consists in manufacturing silicate of soda from sand, soda, or other ingredients by permitting the same to fall onto the bed of a furnace and allowing the molten mass to flow down the said bed, and, if desired, down additional beds of a furnace, in a continuous stream, which during its course is subjected to the heat of the furnace, as fully described hereinafter.

The object of my invention is to render the process of manufacturing silicate of soda continuous and economical.

In order to enable others to practice my invention, I will now proceed to describe the manner of carrying it into effect.

Figure 1:
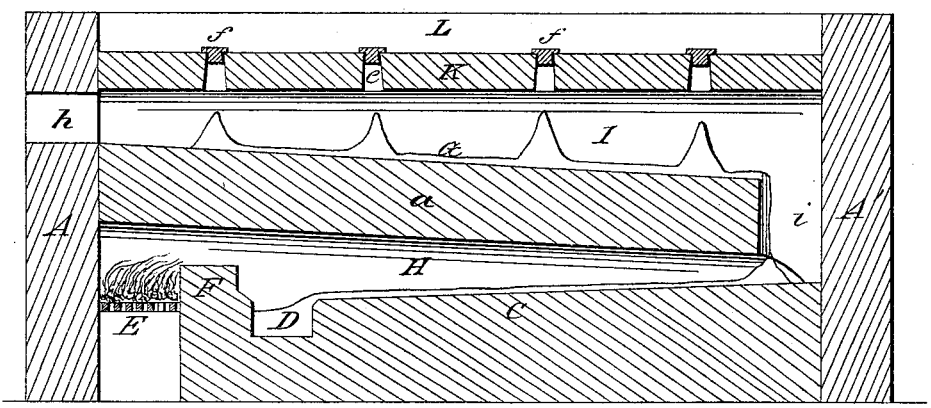
Figure 2:
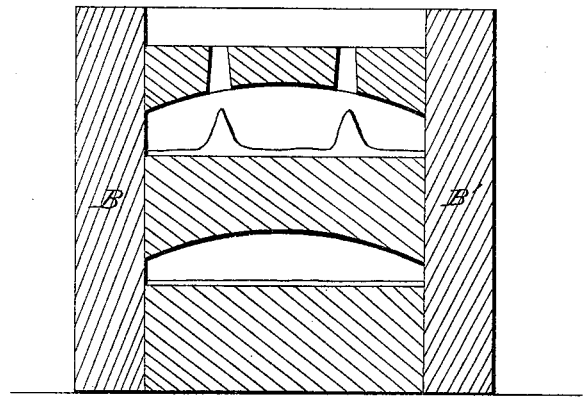

On reference to the accompanying drawings, which form a part of this specification, Figure 1 is a longitudinal section of a furnace for practicing my improved mode of manufacturing silicate of soda; Fig. 2, a transverse section of the same.

A and A' are the two end walls, and B and B' the two side walls, of the furnace, the whole being properly secured by iron plates, rods, and stays, which it has not been deemed necessary to illustrate in the drawings.

C is the lower bed of the furnace, having the inclination shown in the drawings, or an appropriate inclination. This extends in one direction to the wall A' of the furnace, and in the opposite direction to a recess or chamber, D, the object of which will be rendered apparent hereinafter.

E E are the grate-bars of the fire-place, which is situated between the wall A and a bridge, F, the latter separating the said fireplace from the chamber or reservoir D.

G is the upper inclined bed of the furnace, and is formed on the arched partition $a$, the under side of which forms the roof of the lower compartment, H, which communicates with the upper compartment, I, through an opening, $i$.

K is the arched roof of the upper compartment, and is perforated with any convenient number of holes, $e$, through which the ingredients to be converted into silicate of soda are admitted to the upper inclined bed of the furnace, the side and end walls being carried up above the roof K, so as to form a trough or receptacle for the reception of the said ingredients. Each of the openings $e$ may be furnished with a small brick plug or plate, so that the passage of the ingredients into the furnace through the said openings may be interrupted at pleasure. The products of combustion pass from the furnace through the opening $h$, which communicates with an adjacent chimney. The fuel having been ignited, the furnace properly heated, and the materials to be converted into silicate of soda having been deposited in the reservoir at the top of the furnace, any desired number of the plugs or plates $f$ are removed from the openings $e$, when the material will fall through the same onto the inclined upper bed, G, of the furnace, and there assume a pyramidal form beneath such of the openings $e$ as are unobstructed by the plugs $f$. In the meantime these pyramidal masses are subjected to the action of the fire, and the material, reduced to a molten state, flows down the inclined bed G, and from the end of the latter through the opening $i$ onto the lower bed, C, down which it flows into the chamber or reservoir D, the material during its passage being constantly subjected to the direct action of the fire, and maintained in the desired state of fusion from first to last. The silicate of soda which passes into the reservoir D is permitted to flow therefrom through a suitable opening.

Although I prefer the use for carrying out my invention of a furnace with two beds, one having a single inclined bed may be used, providing it be of sufficient length.

Silicate of soda has been manufactured in simple furnaces of such a character that the process had to be discontinued in order to remove the silicate from the furnace and deposit therein a new supply of the ingredients.

My improved process, however, may be continued from day to day without cessation.

I claim as my invention and desire to secure by Letters Patent—

Manufacturing silicate of soda by permitting a supply of the ingredients of which it is composed to fall onto the bed of a furnace, down which, as well as down other beds, if required, the fused silicate flows in a continuous stream to the outlet-opening, and while taking its course is subjected to the direct heat of the furnace, as described.

In testimony whereof I have signed my name to this specification in the presence of two subscribing witnesses.

THOMAS ELKINTON.

Witnesses:
  HENRY HOWSON,
  SAML. F. FLOOD.